United States Patent
Jaakkola

(10) Patent No.: US 9,288,744 B2
(45) Date of Patent: Mar. 15, 2016

(54) METHOD AND APPARATUS FOR SHARING CONNECTIVITY SETTINGS VIA SOCIAL NETWORKS

(75) Inventor: Mikko Lauri Antti Jaakkola, San Diego, CA (US)

(73) Assignee: Nokia Technologies Oy, Espoo (FI)

( * ) Notice: Subject to any disclaimer, the term of this patent is extended or adjusted under 35 U.S.C. 154(b) by 94 days.

(21) Appl. No.: 14/122,728

(22) PCT Filed: May 27, 2011

(86) PCT No.: PCT/IB2011/001188
§ 371 (c)(1),
(2), (4) Date: Nov. 27, 2013

(87) PCT Pub. No.: WO2012/164328
PCT Pub. Date: Dec. 6, 2012

(65) Prior Publication Data
US 2014/0092813 A1    Apr. 3, 2014

(51) Int. Cl.
*H04W 48/10*  (2009.01)
*H04W 48/16*  (2009.01)
*H04L 12/58*  (2006.01)
*H04W 12/04*  (2009.01)
(Continued)

(52) U.S. Cl.
CPC .............. *H04W 48/10* (2013.01); *H04L 51/32* (2013.01); *H04W 12/04* (2013.01); *H04W 48/16* (2013.01); *H04W 84/12* (2013.01); *H04W 88/08* (2013.01)

(58) Field of Classification Search
CPC ..... H04W 48/16; H04W 48/10; H04W 12/04; H04W 88/08; H04W 84/12; H04L 51/32
See application file for complete search history.

(56) References Cited

U.S. PATENT DOCUMENTS 7,263,076 B1    8/2007    Leibovitz et al.
7,466,810 B1    12/2008   Quon et al.
(Continued)

FOREIGN PATENT DOCUMENTS

JP    2007-531568 A    11/2007
JP    2010-518779 A    5/2010
(Continued)

OTHER PUBLICATIONS

Office action received for corresponding Mexican Patent Application No. MX/a/13/013784, dated Aug. 22, 2014, 4 pages.
(Continued)

*Primary Examiner* — Brian D Nguyen
(74) *Attorney, Agent, or Firm* — Alston & Bird LLP

(57) ABSTRACT

An apparatus for enabling sharing of one or more connectivity parameters with one or more friends may include a processor and memory storing executable computer code causing the apparatus to at least perform operations including detecting one or more connection parameters and associated data of at least one access point. The computer program code may further cause the apparatus to facilitate provision of the connection parameters and associated data for inclusion within at least one profile of a user. The profile may be associated with a social network service identifying one or more relationships among one or more determined friends of the user. The computer program code may further cause the apparatus to enable provision of the connection parameters and associated data to at least one device of the user or one or more devices of the friends. Corresponding methods and computer program products are also provided.

26 Claims, 6 Drawing Sheets

(51) Int. Cl.
*H04W 88/08* (2009.01)
*H04W 84/12* (2009.01)

(56) References Cited

U.S. PATENT DOCUMENTS

| | | | |
|---|---|---|---|
| 7,788,707 | B1 | 8/2010 | Zhou |
| 2005/0209002 | A1 | 9/2005 | Blythe et al. |
| 2006/0221915 | A1 | 10/2006 | Gatta et al. |
| 2006/0248573 | A1 | 11/2006 | Pannu et al. |
| 2007/0032244 | A1 | 2/2007 | Counts et al. |
| 2007/0174613 | A1 | 7/2007 | Paddon et al. |
| 2007/0243859 | A1* | 10/2007 | Dinsing et al. ............. 455/414.1 |
| 2008/0086431 | A1* | 4/2008 | Robinson et al. ............... 706/11 |
| 2008/0123683 | A1 | 5/2008 | Cheng et al. |
| 2008/0171561 | A1 | 7/2008 | Irony et al. |
| 2008/0195741 | A1 | 8/2008 | Wynn et al. |
| 2008/0305832 | A1 | 12/2008 | Greenberg |
| 2009/0069051 | A1* | 3/2009 | Jain et al. ...................... 455/558 |
| 2009/0083401 | A1 | 3/2009 | Son et al. |
| 2010/0157823 | A1 | 6/2010 | Li et al. |
| 2010/0257239 | A1 | 10/2010 | Roberts |
| 2010/0257823 | A1* | 10/2010 | Lang ............................... 53/490 |
| 2010/0274815 | A1* | 10/2010 | Vanasco ........................ 707/798 |
| 2011/0060816 | A1 | 3/2011 | Kumar et al. |
| 2011/0069661 | A1* | 3/2011 | Waytena et al. .............. 370/328 |
| 2011/0201329 | A1* | 8/2011 | Carter ......................... 455/432.1 |
| 2011/0238673 | A1* | 9/2011 | Carter et al. .................. 707/748 |

FOREIGN PATENT DOCUMENTS

| | | | |
|---|---|---|---|
| WO | WO 2006/106393 | A2 | 10/2006 |
| WO | 2007/013629 | A1 | 2/2007 |
| WO | 2008/094751 | A1 | 8/2008 |
| WO | 2010038114 | A1 | 4/2010 |
| WO | 2011/006231 | A1 | 1/2011 |

OTHER PUBLICATIONS

Office action received for corresponding Singapore Patent Application No. 201308416.5, dated Jan. 26, 2015, 4 pages.

Office action received for corresponding Chile Patent Application No. 03398/2013, dated Jan. 23, 2015, 8 pages of office action and No English Language Translation available.

Office action received for corresponding Korean Patent Application No. 2013-7034514, dated Feb. 23, 2015, 5 pages of office action and No English Language Translation available.

Gurumurthy, "Envisioning Social Computing Applications on Wireless Networks", Electrical and Computer Engineering, Dissertations and Thesis, Feb., 2009, 84 Pages.

Cutillo et al., "Leveraging Social Links for Trust and Privacy in Networks", Open Research Problems in Network Security, IFIP Advances in Information and Communication Technology, vol. 309, 2009, 11 pages.

Office action received for corresponding Singapore Patent Application No. 201308416.5, dated Jun. 30, 2014, 12 pages.

International Search Report and Written Opinion received in corresponding Patent Cooperation Treaty Application No. PCT/IB2011/001188. Dated Feb. 22, 2012. 11 Pages.

Office action received for corresponding Japanese Patent Application No. 2014-511961, dated Jan. 14, 2015, 3 pages of office action and 5 pages of office action translation.

Office Action from corresponding Ukrainian Application No. a2013 13241, dated Aug. 19, 2015.

Extended European Search Report for corresponding European Application No. 11866720.3 dated Jul. 23, 2015, 6 pages.

Office Action for corresponding Mexican Application No. MX/a/2013/013784 dated May 12, 2015.

Office Action for corresponding Russian Application No. 2013152336 dated Jun. 4, 2015.

Office Action for corresponding Ukraine Application No. A201313241 dated Jun. 8, 2015.

Office Action for Canadian Application No. 2,834,737 dated Aug. 3, 2015.

Office Action from corresponding Korean Application No. 2013-7034514, dated Aug. 27, 2015.

Office action received for corresponding Kazakhstan Patent Application No. 2013/1685.1, dated Apr. 7, 2015, 3 pages of office action and 2 pages of office action translation available.

Form 18 for corresponding ARIPO Patent Application No. AP/P/2013/007248 dated Sep. 10, 2015, 6 pages.

Office Action for corresponding Chilean Application No. 2013-03398 dated Nov. 19, 2015.

* cited by examiner

METHOD AND APPARATUS FOR SHARING CONNECTIVITY SETTINGS VIA SOCIAL NETWORKS

RELATED APPLICATION

This application was originally filed as PCT Application No. PCT/IB2011/001188 filed May 27, 2011.

TECHNOLOGICAL FIELD

Example embodiments of the present invention relate generally to configuring connectivity settings of communication devices and more particularly, relate to a method and apparatus for sharing connectivity settings based in part on one or more social network connections.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. Due to the now ubiquitous nature of electronic communication devices, people of all ages and education levels are utilizing electronic devices to communicate with other individuals or contacts, receive services and/or share information, media and other content. One area in which there is a demand to increase ease of information transfer relates to services for configuring connectivity settings of communication devices.

At present, many connectivity technologies typically require some configuration or establishing of a trust relationship between a device (for example, mobile device) and a network access point (for example, a Wireless Fidelity (Wi-Fi) access point). This typically may require the device to obtain domain specific knowledge of the network access point and may require explicit actions from an end user of the device. For instance, an end user utilizing a device may need to make one or more manual selections to facilitate the exchange of configuration settings between the device and the network access point for establishing a connection. For example, a user may need to obtain network identifiers, security keys and/or passwords to enable a device to establish a connection with a network access point.

BRIEF SUMMARY

A method and apparatus may provide an efficient and reliable mechanism for sharing one or more connectivity parameters and associated data to one or more devices of a user(s) and/or one or more devices of friends of the user(s).

In this regard, a communication device(s) may utilize one or more established trust relationships (for example, friend relationships) of one or more social network services (for example, Facebook™, Twitter™, LinkedIn™, MySpace™, Skype™, etc.) to configure and/or share one or more connection parameters (for example, network settings) and associated data (for example, passwords, security settings, certificates, etc.) with one or more devices of the user(s) and/or one or more devices of friends of the user(s).

In this regard, according to some example embodiments, a communication device(s) may utilize the shared connection parameters to facilitate connection with one or more access points (for example, network access points (for example, Wi-Fi hotspots/networks, etc.)). As such, some example embodiments may utilize the shared connection parameters to enable one or more devices of the user(s) and/or one or more devices of the friends of the user to automatically connect to respective access points. In this manner, upon receipt of the connection parameters and associated data, the devices may automatically connect to the access points in an instance in which the devices may be within a vicinity (for example, a location) of the access points. As such, some example embodiments may enable a device(s) of a user(s) and/or a device(s) of one or more friends of the user to connect to an access point(s) with minimal or no user-interaction.

In one example embodiment, a method for enabling sharing of one or more connectivity parameters with one or more friends is provided. The method may include detecting one or more connection parameters and associated data of at least one access point. The method may further include facilitating provision of the connection parameters and associated data for inclusion within at least one profile of a user. The profile may be associated with a social network service identifying one or more relationships among one or more determined friends of the user. The method may further include enabling provision of the connection parameters and associated data to at least one device of the user or one or more devices of the friends.

In another example embodiment, an apparatus for enabling sharing of one or more connectivity parameters with one or more friends is provided. The apparatus may include a processor and a memory including computer program code. The memory and the computer program code are configured to, with the processor, cause the apparatus to at least perform operations including detecting one or more connection parameters and associated data of at least one access point. The memory and the computer program code may further cause the apparatus to facilitate provision of the connection parameters and associated data for inclusion within at least one profile of a user. The profile may be associated with a social network service identifying one or more relationships among one or more determined friends of the user. The memory and the computer program code may further cause the apparatus to enable provision of the connection parameters and associated data to at least one device of the user or one or more devices of the friends.

In another example embodiment, a computer program product for enabling sharing of one or more connectivity parameters with one or more friends is provided. The computer program product includes at least one computer-readable storage medium having computer executable program code instructions stored therein. The computer executable program code instructions may include program code instructions configured to detect one or more connection parameters and associated data of at least one access point. The program code instructions may also be configured to facilitate provision of the connection parameters and associated data for inclusion within at least one profile of a user. The profile may be associated with a social network service identifying one or more relationships among one or more determined friends of the user. The program code instructions may also be configured to enable provision of the connection parameters and associated data to at least one device of the user or one or more devices of the friends.

In another example embodiment, an apparatus for enabling sharing of one or more connectivity parameters with one or more friends is provided. The apparatus may include a processor and a memory including computer program code. The memory and the computer program code are configured to, with the processor, cause the apparatus to at least perform operations including receiving a detection of one or more connection parameters and associated data of at least one access point. The memory and the computer program code may further cause the apparatus to facilitate inclusion of the connection parameters and associated data within at least one profile of a user. The connection parameters and associated data may be included within the profile of the user in response to determining that the profile is associated with a social network service identifying one or more relationships among one or more friends of the user. The memory and the computer program code may further cause the apparatus to enable provision of the connection parameters and associated data to at least one device of the user or one or more devices of the friends to enable the device or the devices to utilize the connection parameters and associated data to connect to the access point.

Some example embodiments may provide a better user experience by facilitating the sharing of connection parameters without requiring user interaction. As such, device users may enjoy improved capabilities with respect to establishing connections with network access points.

BRIEF DESCRIPTION OF THE SEVERAL VIEWS OF THE DRAWINGS

Figure 1:
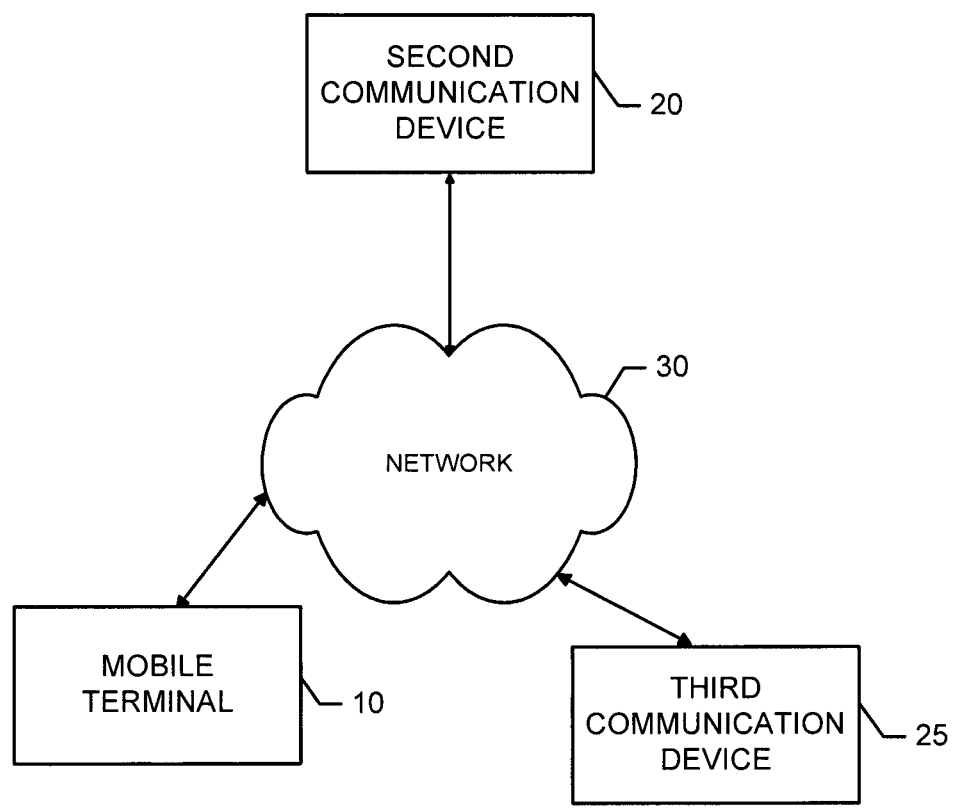
Figure 2:
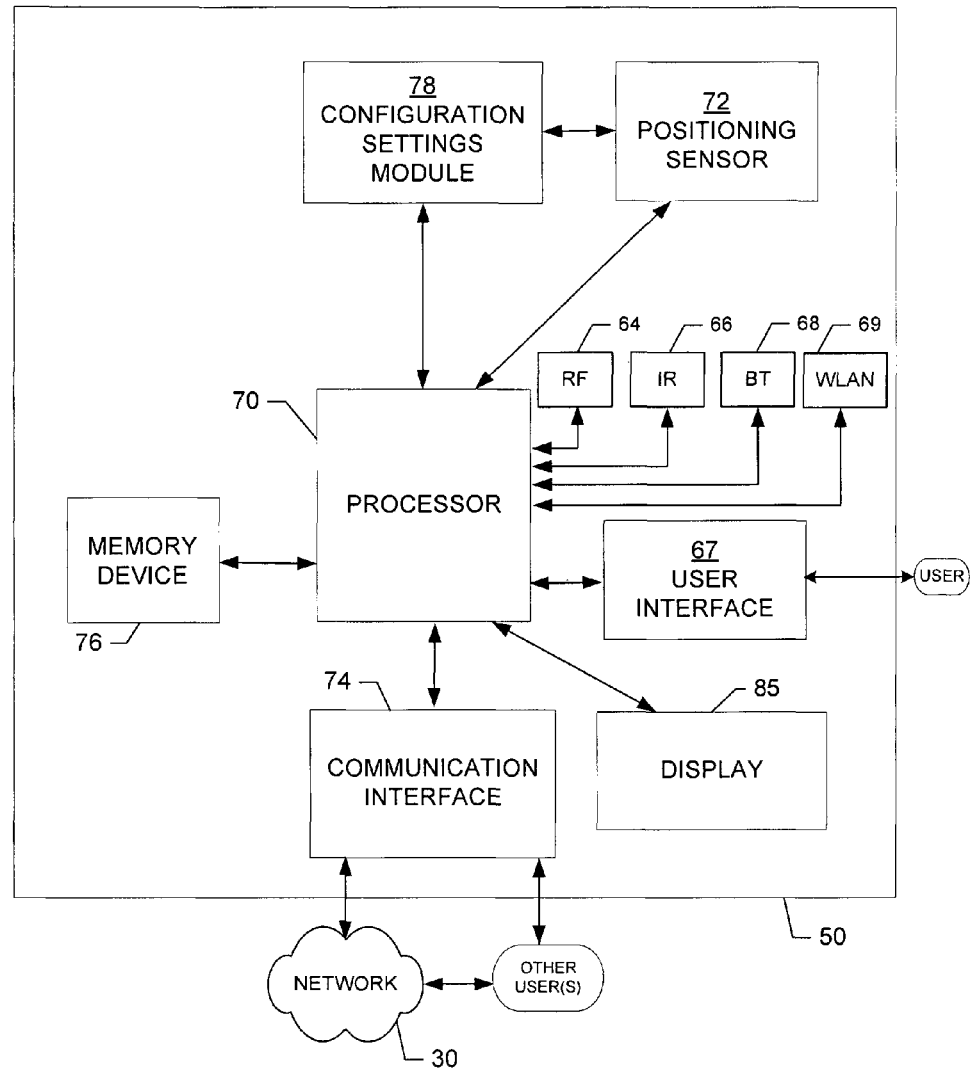
Figure 3:
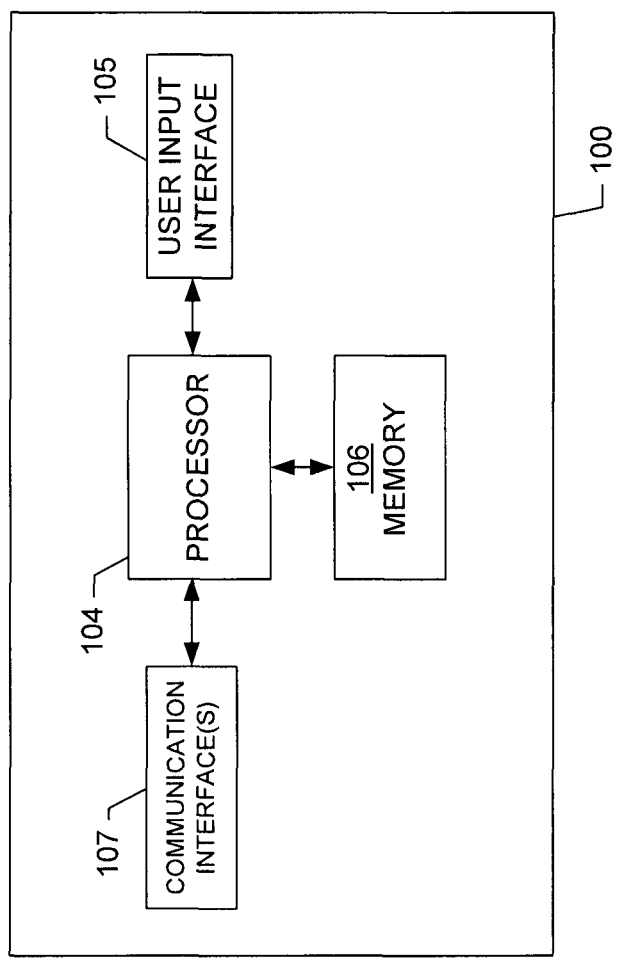
Figure 4:
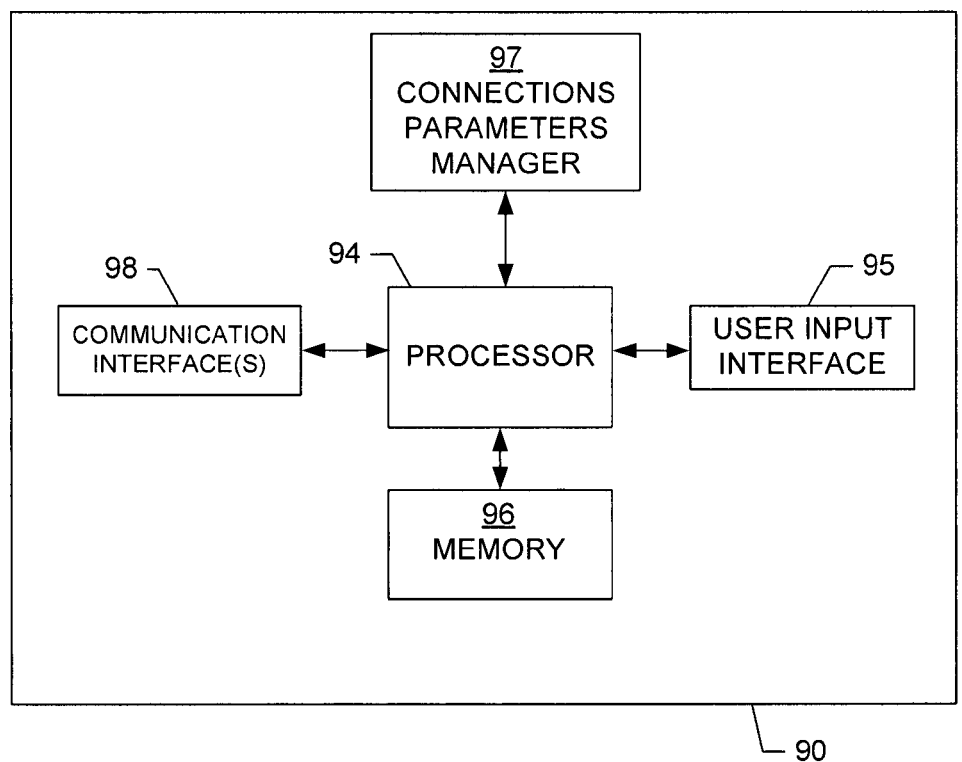
Figure 5:
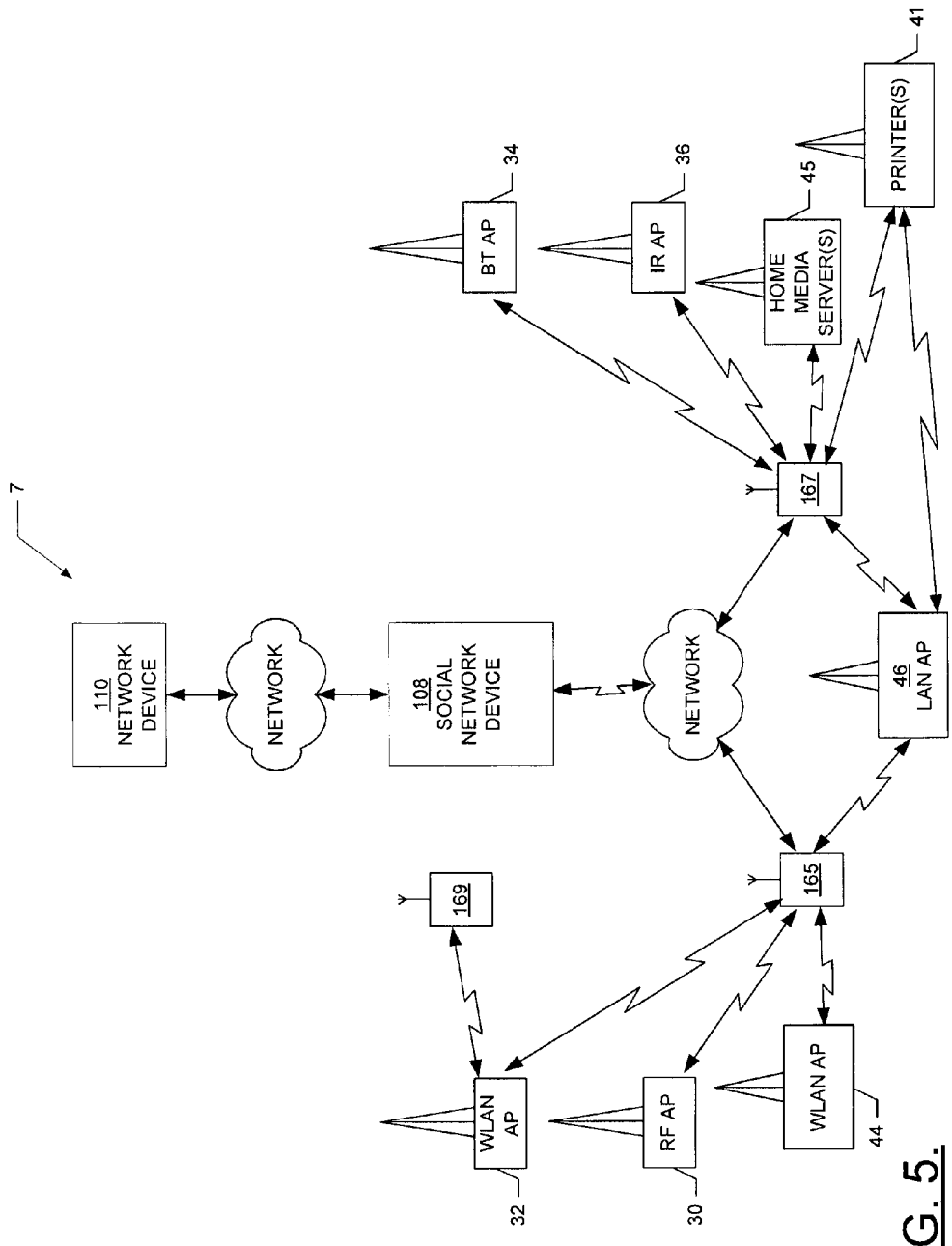
Figure 6:
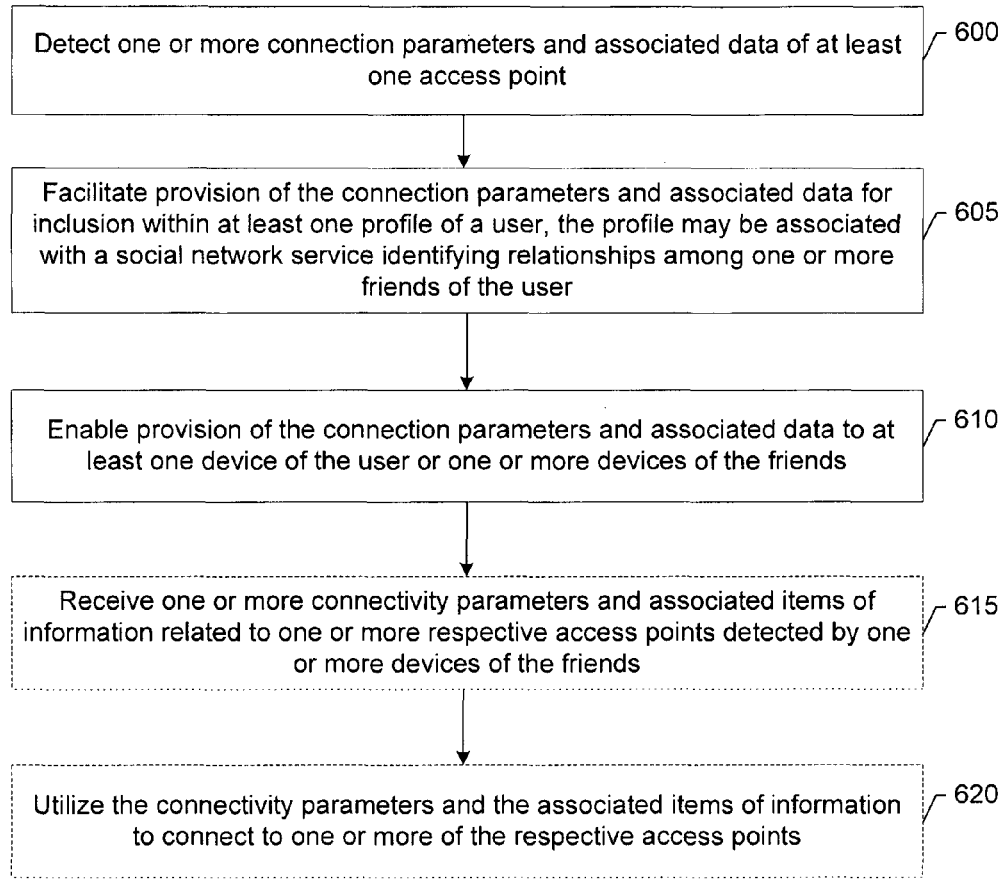

Having thus described the invention in general terms, reference will now be made to the accompanying drawings, which are not necessarily drawn to scale, and wherein:

FIG. 1 is a schematic block diagram of a system according to example embodiments of the invention;

FIG. 2 is a schematic block diagram of an apparatus according to example embodiments of the invention;

FIG. 3 is a schematic block diagram of a network entity according to example embodiments of the invention;

FIG. 4 is a schematic block diagram of a network device according to example embodiments of the invention;

FIG. 5 is a block diagram of a system according to example embodiments of the invention; and FIG. 6 illustrates a flowchart for providing one or more connectivity parameters to one or more devices based in part on one or more social network service connections according to example embodiments of the invention.

DETAILED DESCRIPTION

Some example embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein. Like reference numerals refer to like elements throughout. As used herein, the terms "data," "content," "information" and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (for example, implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein a "computer-readable storage medium," which refers to a non-transitory, physical or tangible storage medium (for example, volatile or non-volatile memory device), may be differentiated from a "computer-readable transmission medium," which refers to an electromagnetic signal.

As referred to herein, a "hotspot(s)", "WLAN hotspot(s)" and similar terms may be used interchangeably to refer to a site, device (for example, network device), access point (AP) (for example, router (for example, a WLAN AP, etc.)) or the like that may provide or offer Internet access over a Local Area Network (LAN), a Wireless Local Area Network (WLAN) or any other suitable network through the use of a connection to a link to an Internet service provider, for example.

At present, some users may not know exactly what to do in order to establish a connection for the exchange of configuration settings between a device and a network access point. Other users of devices may simply not bother to utilize their devices to establish a connection with network access points due to disinterest, a burden associated with the manual user-interaction typically required for the device to establish a connection with a network access point or any of a number of other reasons. As such, many existing network access points may not be used by devices in the vicinity of a corresponding network access point. In this regard, currently cellular data being provided by a network operator may not be offloaded from the network operator to network access points as often as it could be which may cause resources of the network operator to remain restrained.

In view of the foregoing drawbacks, it may be beneficial to provide an efficient and reliable manner in which to establish a mechanism for utilizing previously established trust relationships to share and configure network settings in such a way that eliminates or minimizes the impact on the interactions of users for establishing connections between devices.

FIG. 1 illustrates a generic system diagram in which a device such as a mobile terminal 10 is shown in a communication environment according to some example embodiments. As shown in FIG. 1, a system in accordance with some example embodiments may include a first communication device (for example, mobile terminal 10) and a second communication device 20 capable of communication with each other via a network 30. In some cases, embodiments of the present invention may further include one or more additional communication devices, one of which is depicted in FIG. 1 as a third communication device 25. In some embodiments, not all systems that employ an embodiment of the present invention may comprise all the devices illustrated and/or described herein. While example embodiments of the mobile terminal 10 and/or second and third communication devices 20 and 25 may be illustrated and hereinafter described for purposes of example, other types of terminals, such as portable digital assistants (PDAs), pagers, mobile televisions, mobile telephones, gaming devices, laptop computers, cameras, video recorders, audio/video players, radios, global positioning system (GPS) and/or Global Navigation Satellite System (GLONASS) devices, Bluetooth headsets, Universal Serial Bus (USB) devices or any combination of the aforementioned, and other types of voice and text communications systems, can readily employ embodiments of the present invention. Furthermore, devices that are not mobile, such as servers and personal computers may also readily employ embodiments of the present invention.

The network 30 may include a collection of various different nodes (of which the second and third communication devices 20 and 25 may be examples), devices or functions that may be in communication with each other via corresponding wired and/or wireless interfaces. As such, the illustration of FIG. 1 should be understood to be an example of a broad view of certain elements of the system and not an all inclusive or detailed view of the system or the network 30. According to some example embodiments the network 30 may be capable of supporting communication in accordance with any one or more of a number of First-Generation (1G), Second-Generation (2G), 2.5G, Third-Generation (3G), 3.5G, 3.9G, Fourth-Generation (4G) mobile communication protocols, Long Term Evolution (LTE) or Evolved Universal Terrestrial Radio Access Network (E-UTRAN), Self Optimizing/Organizing Network (SON) intra-LTE, inter-Radio Access Technology (RAT) Network and/or the like. According to some example embodiments, the network 30 may be a point-to-point (P2P) network. One or more communication terminals such as the mobile terminal 10 and the second and third communication devices 20 and 25 may be in communication with each other via the network 30 and each may include an antenna or antennas for transmitting signals to and for receiving signals from one or more base sites. The base sites could be, for example one or more base stations (BS) that is a part of one or more cellular or mobile networks or one or more access points (APs) that may be coupled to a data network, such as a Local Area Network (LAN), Wireless Local Area Network (WLAN), a Wi-Fi Network, a Metropolitan Area Network (MAN), and/or a Wide Area Network (WAN), such as the Internet. In turn, other devices such as processing elements (for example, personal computers, server computers or the like) may be coupled to the mobile terminal 10 and the second and third communication devices 20 and 25 via the network 30. By directly or indirectly connecting the mobile terminal 10 and the second and third communication devices 20 and 25 (and/or other devices) to the network 30, the mobile terminal 10 and the second and third communication devices 20 and 25 may be enabled to communicate with the other devices or each other. For example, the mobile terminal 10 and the second and third communication devices 20 and 25 as well as other devices may communicate according to numerous communication protocols including Hypertext Transfer Protocol (HTTP) and/or the like, to thereby carry out various communication or other functions of the mobile terminal 10 and the second and third communication devices 20 and 25, respectively.

Furthermore the mobile terminal 10 and the second and third communication devices 20 and 25 may communicate in accordance with, for example, Radio Frequency (RF), Cellular, Near Field Communication (NFC), Bluetooth (BT), Infrared (IR) or any of a number of different wireline or wireless communication techniques, including Local Area Network (LAN), Wireless LAN (WLAN), Worldwide Interoperability for Microwave Access (WiMAX), Wireless Fidelity (Wi-Fi), Ultra-Wide Band (UWB), Wibree techniques and/or the like. As such, the mobile terminal 10 and the second and third communication devices 20 and 25 may be enabled to communicate with the network 30 and each other by any of numerous different access mechanisms. For example, mobile access mechanisms such as Wideband Code Division Multiple Access (W-CDMA), CDMA2000, Global System for Mobile communications (GSM), General Packet Radio Service (GPRS) and/or the like may be supported as well as wireless access mechanisms such as WLAN, WiMAX, and/or the like and fixed access mechanisms such as Digital Subscriber Line (DSL), cable modems, Ethernet and/or the like.

According to some example embodiments, the first communication device (for example, the mobile terminal 10) may be a mobile communication device such as, for example, a wireless telephone or other devices such as a personal digital assistant (PDA), mobile computing device, camera, video recorder, audio/video player, positioning device, game device, television device, radio device, or various other like devices or combinations thereof The second communication device 20 and the third communication device 25 may be mobile or fixed communication devices. However, in one example, the second communication device 20 and the third communication device 25 may be servers, remote computers or terminals such as personal computers (PCs) or laptop computers.

According to some example embodiments, the network 30 may be an ad hoc or distributed network arranged to be a smart space. Thus, devices may enter and/or leave the network 30 and the devices of the network 30 may be capable of adjusting operations based on the entrance and/or exit of other devices to account for the addition or subtraction of respective devices or nodes and their corresponding capabilities.

According to some example embodiments, the mobile terminal as well as the second and third communication devices 20 and 25 may employ an apparatus (for example, apparatus of FIG. 2) capable of functioning according to example embodiments of the invention.

FIG. 2 illustrates a schematic block diagram of an apparatus for configuring connectivity settings based in part on using previously established trust relationships according to some example embodiments. Some example embodiments of the invention will now be described with reference to FIG. 2, in which certain elements of an apparatus 50 are displayed. The apparatus 50 of FIG. 2 may be employed, for example, on the mobile terminal 10 (and/or the second communication device 20 or the third communication device 25). Alternatively, the apparatus 50 may be embodied on a network device of the network 30. However, the apparatus 50 may alternatively be embodied at a variety of other devices, both mobile and fixed (such as, for example, any of the devices listed above). In some cases, an embodiment may be employed on a combination of devices. Accordingly, some embodiments of the invention may be embodied wholly at a single device (for example, the mobile terminal 10), by a plurality of devices in a distributed fashion (for example, on one or a plurality of devices in a P2P network) or by devices in a client/server relationship. Furthermore, it should be noted that the devices or elements described below may not be mandatory and thus some may be omitted in some embodiments.

Referring now to FIG. 2, the apparatus 50 may include or otherwise be in communication with a processor 70, a user interface 67, a communication interface 74, a memory device 76, a display 85, a configuration settings module 78 and a positioning sensor 72. According to some example embodiments, the display 85 may be a touch screen display. The memory device 76 may include, for example, volatile and/or non-volatile memory. For example, the memory device 76 may be an electronic storage device (for example, a computer readable storage medium) comprising gates configured to store data (for example, bits) that may be retrievable by a machine (for example, a computing device like processor 70). In some embodiments, the memory device 76 may be a tangible memory device that is not transitory. The memory device 76 may be configured to store information (for example, device or network configuration settings, etc.), data, files, applications, instructions or the like for enabling the apparatus to carry out various functions in accordance with example embodiments of the invention. For example, the memory device 76 could be configured to buffer input data for processing by the processor 70. Additionally or alternatively, the memory device 76 could be configured to store instructions for execution by the processor 70. As yet another alternative, the memory device 76 may be one of a plurality of databases that store information and/or media content (for example, pictures, videos, etc.). The memory device 76 may also store data received from one or more radio frequency devices (for example, access points (for example, WLAN access points, RF access points, BT access points, IR access points, etc.).

The apparatus 50 may, according to some example embodiments, be a mobile terminal (for example, mobile terminal 10) or a fixed communication device or computing device configured to employ example embodiments of the invention. According to some example embodiments, the apparatus 50 may be embodied as a chip or chip set. In other words, the apparatus 50 may comprise one or more physical packages (for example, chips) including materials, components and/or wires on a structural assembly (for example, a baseboard). The structural assembly may provide physical strength, conservation of size, and/or limitation of electrical interaction for component circuitry included thereon. The apparatus 50 may therefore, in some cases, be configured to implement embodiments of the invention on a single chip or as a single "system on a chip." As such, in some cases, a chip or chipset may constitute means for performing one or more operations for providing the functionalities described herein. Additionally or alternatively, the chip or chipset may constitute means for enabling user interface navigation with respect to the functionalities and/or services described herein.

The processor 70 may be embodied in a number of different ways. For example, the processor 70 may be embodied as one or more of various processing means such as a coprocessor, microprocessor, a controller, a digital signal processor (DSP), processing circuitry with or without an accompanying DSP, or various other processing devices including integrated circuits such as, for example, an ASIC (application specific integrated circuit), an FPGA (field programmable gate array), a microcontroller unit (MCU), a hardware accelerator, a special-purpose computer chip, or the like. In some example embodiments, the processor 70 may be configured to execute instructions stored in the memory device 76 or otherwise accessible to the processor 70. As such, whether configured by hardware or software methods, or by a combination thereof, the processor 70 may represent an entity (for example, physically embodied in circuitry) capable of performing operations according to embodiments of the invention while configured accordingly. Thus, for example, when the processor 70 is embodied as an ASIC, FPGA or the like, the processor 70 may be specifically configured hardware for conducting the operations described herein. Alternatively, as another example, when the processor 70 is embodied as an executor of software instructions, the instructions may specifically configure the processor 70 to perform the algorithms and operations described herein when the instructions are executed. However, in some cases, the processor 70 may be a processor of a specific device (for example, a mobile terminal or network device) adapted for employing embodiments of the invention by further configuration of the processor 70 by instructions for performing the algorithms and operations described herein. The processor 70 may include, among other things, a clock, an arithmetic logic unit (ALU) and logic gates configured to support operation of the processor 70.

In some example embodiments, the processor 70 may be configured to operate a connectivity program, such as a browser, Web browser or the like. In this regard, the connectivity program may enable the apparatus 50 to transmit and receive Web content, such as for example location-based content or any other suitable content, according to a HTTP Application Protocol, for example.

The communication interface 74 may be any means such as a device or circuitry embodied in either hardware, a computer program product, or a combination of hardware and software that is configured to receive and/or transmit data from/to a network and/or any other device or module in communication with the apparatus 50. In this regard, the communication interface 74 may include, for example, an antenna (or multiple antennas) and supporting hardware and/or software for enabling communications with a wireless communication network (for example, network 30). In fixed environments, the communication interface 74 may alternatively or also support wired communication. As such, the communication interface 74 may include a communication modem and/or other hardware/software for supporting communication via cable, digital subscriber line (DSL), universal serial bus (USB), Ethernet or other mechanisms.

The user interface 67 may be in communication with the processor 70 to receive an indication of a user input at the user interface 67 and/or to provide an audible, visual, mechanical or other output to the user. As such, the user interface 67 may include, for example, a keyboard, a mouse, a joystick, a display, a touch screen, a microphone, a speaker, or other input/output mechanisms. In some example embodiments in which the apparatus is embodied as a server or some other network devices, the user interface 67 may be limited, remotely located, or eliminated. The processor 70 may comprise user interface circuitry configured to control at least some functions of one or more elements of the user interface, such as, for example, a speaker, ringer, microphone, display, and/or the like. The processor 70 and/or user interface circuitry comprising the processor 70 may be configured to control one or more functions of one or more elements of the user interface through computer program instructions (for example, software and/or firmware) stored on a memory accessible to the processor 70 (for example, memory device 76, and/or the like).

As shown in FIG. 2, the apparatus 50 may also include one or more means for sharing and/or obtaining data. For example, the apparatus may comprise a short range radio frequency (RF) transceiver and/or interrogator 64 so data may be shared with and/or obtained from electronic devices (for example, a RF access point(s)) in accordance with RF techniques. The apparatus may comprise other short range transceivers, such as, for example an infrared (IR) transceiver 66, a Bluetooth™ (BT) transceiver 68 operating using Bluetooth™ brand wireless technology developed by the Bluetooth™ Special Interest Group, and/or the like. The Bluetooth transceiver 68 may be configured to operate according to Wibree™ radio standards. The apparatus 50 may also include a WLAN transceiver 69 configured to transmit and/or receive data from electronic devices (for example, a WLAN access point(s)) according to a WLAN technique such as, for example, IEEE 802.11 techniques. In some example embodiments, the WLAN transceiver 69 may also be configured to transmit and/or receive data from electronic devices according to various wireless networking techniques, including, but not limited to, Wi-Fi, LAN techniques, and/or the like. In some example embodiments, the WLAN transceiver 69 may also be configured to transmit and/or receive data from electronic devices such as, for example, one or more printers, and/or one or more home media servers or any other suitable devices. In this regard, the apparatus 50 and, in particular, the short range transceiver may be capable of transmitting data to and/or receiving data from electronic devices (for example, an IR access point(s), a BT access point(s)) within a proximity of the apparatus, such as within 10 meters, for example.

In addition, the apparatus 50 may include a positioning sensor 72. The positioning sensor 72 may include, for example, a global positioning system (GPS) sensor, an assisted global positioning system (Assisted-GPS) sensor, a Bluetooth (BT)-GPS mouse, other GPS or positioning receivers or the like. However, some example embodiments, the positioning sensor 72 may include a pedometer or inertial sensor. In this regard, the positioning sensor 72 may be capable of determining a location of the apparatus 50, such as, for example, longitudinal and latitudinal directions of the apparatus 50, or a position relative to a reference point such as a destination or start point. The positioning sensor 72 may also be capable of determining an altitude of the apparatus 50 and may use the altitude information in determining the location of the apparatus 50. Information from the positioning sensor 72 may then be communicated to a memory (for example, memory device 76) of the apparatus 50 or to another memory device to be stored as a position history or location information. In this regard, for example, the position history may define a series of data points corresponding to positions or locations of the apparatus 50 at respective times. Various events or activities of the apparatus 50 may also be recorded in association with position history or location information provided by the positioning sensor 72.

In some example embodiments, the processor 70 may be embodied as, include or otherwise control the configuration settings module 78. The configuration settings module 78 may be any means such as a device or circuitry operating in accordance with software or otherwise embodied in hardware or a combination of hardware and software (for example, processor 70 operating under software control, the processor 70 embodied as an ASIC or FPGA specifically configured to perform the operations described herein, or a combination thereof) thereby configuring the device or circuitry to perform the corresponding functions of the configuration settings module 78, as described below. Thus, in an example in which software is employed, a device or circuitry (for example, the processor 70 in one example) executing the software forms the structure associated with such means.

The configuration settings module 78 may enable one or more users of an apparatus (for example, apparatus 50) to share one or more connectivity parameters (also referred to interchangeably as "connection parameters," "connectivity settings", "connection settings" or the like) of one or more access points (for example, a WLAN device (for example, a WLAN hotspot, a WLAN AP, etc.)) with their friends, or friends of their friends, connected via a social network service (for example, Facebook™, Twitter™, LinkedIn™, MySpace™, Skype™, etc.) for example. In this regard, the connection settings module 78 may transfer or send one or more connection parameters (for example, network settings) and any other suitable information (for example, passwords, security keys, certificates, a list of other devices (for example, computer, laptop, PDA, etc.) of the user, etc.) to a network device. The network device (for example, network device 90 of FIG. 4, network device 110 of FIG. 5, etc.) may store the received connection parameters and the other information in a profile on behalf of a user(s) of an apparatus (for example, apparatus 50) sending the connection parameters to the network device. The profile may be stored in a memory of the network device.

The network device may receive or store data of a social network service indicating one or more connections with one or more friends of a user of an apparatus (for example, apparatus 50). In this regard, the network device may share the one or more connection parameters stored in the profile of the user with one or more other devices (for example, other apparatus 50) of the user and/or one or more devices (for example, an apparatus 50, communication device 20, third communication device 25) of one or more friends of the user. The one or more friends of the user may be determined by the network device in response to analyzing friends data (for example, data indicating one or more friends of a user) received or stored by the network device.

In this regard, in an instance in which a user of an apparatus (for example, apparatus 50) may activate (for example, start or turn on) one or more of other devices of the user, the network device may provide these other devices with the connection parameters stored in the profile of the user, as described more fully below. In this manner, the devices being activated may receive the connection parameters from the network device and in an instance in which the devices are in a vicinity of one or more of the access points, the devices may utilize the connection parameters to automatically connect to the corresponding access points (for example, WLAN hotspots) with minimal or no user interaction.

Additionally, in an instance in which one or more of the friends may activate one or more of their devices (for example, apparatus 50, second communication device 20, third communication device 25) in the vicinity of one of the access points, the devices of the friends may automatically connect to the access points with little or no user interaction, as described more fully below. The devices of the friends may automatically connect to the access points based in part on utilizing the connection parameters provided to the devices by the network device.

Referring now to FIG. 3, a block diagram of some example embodiments of a network entity is provided. As shown in FIG. 3, the network entity (for example, a server) generally includes a processor 104 and an associated memory 106. The memory 106 may comprise volatile and/or non-volatile memory, and may store content, data and/or the like. The memory 106 may store client applications, instructions, and/or the like for the processor 104 to perform the various operations of the network entity 100. In some example embodiments, the memory 106 may store data associated with one or more connections or links among friends (for example, a first level of trust) and/or friends of friends (for example, a second or subsequent level of trust).

The processor 104 may also be connected to at least one communication interface 107 or other means for displaying, transmitting and/or receiving data, content, and/or the like. The user input interface 105 may comprise any of a number of devices allowing the network entity 100 to receive data from a user, such as a keypad, a touch display, a joystick or other input device. In this regard, the processor 104 may comprise user interface circuitry configured to control at least some functions of one or more elements of the user input interface. The processor 104 and/or user interface circuitry of the processor may be configured to control one or more functions of one or more elements of the user interface through computer program instructions (for example, software and/or firmware) stored on a memory accessible to the processor (for example, volatile memory, non-volatile memory, and/or the like).

The network entity 100 may receive one or more requests from a device (for example, a connections parameter manager 97 of the network device 90 in some example embodiments) for information identifying one or more friends of one or more users of an apparatus (for example, apparatus 50). In response to receipt of the request, the processor 104 may provide data to the requesting device (for example, connections parameter manager 97) indicating one or more friends, or friends of friends, of a respective user of an apparatus (for example, apparatus 50). In response to receipt of the friends data (for example, a list of friends indicating connections/links among friends) by the requesting device, the requesting device may send other devices of the user and one or more devices of the friends, connection parameters associated with a profile of the user. In this regard, the other devices of the user and the devices of the friends may utilize the connection parameters to connect to corresponding access points when the devices are in a vicinity (for example, a location) of the corresponding access points (for example, WLAN hot spots).

Referring now to FIG. 4, a block diagram of one example of a network device is provided. According to some example embodiments, the network device 90 may be a standalone network device. According to some example embodiments, the network entity 100 may be embodied within the network device 90. As shown in FIG. 4, the network device 90 (for example, a server) generally includes a processor 94 and an associated memory 96. The memory 96 may comprise volatile and/or non-volatile memory, and may store content, data and/or the like. For example, the memory may store content, data, information, and/or the like transmitted from, and/or received by, the network device. Also for example, the memory 96 may store client applications, instructions, and/or the like for the processor 94 to perform the various operations of the network device in accordance with example embodiments of the invention, as described herein. The memory 96 may also store one or more connection parameters corresponding to one or more access points and associated data (for example, security keys, passwords, certificates, etc.) as well as any other suitable information. The connection parameters and the associated data may be stored in a profile(s) on behalf of one or more users.

In addition to the memory 96, the processor 94 may also be connected to at least one interface or other means for displaying, transmitting and/or receiving data, content, and/or the like. In this regard, the interface(s) may comprise at least one communication interface 98 or other means for transmitting and/or receiving data, content, and/or the like, as well as at least one user input interface 95. The user input interface 95, in turn, may comprise any of a number of devices allowing the network device to receive data from a user, such as a keypad, a touch display, a joystick or other input device. In this regard, the processor 94 may comprise user interface circuitry configured to control at least some functions of one or more elements of the user input interface. The processor and/or user interface circuitry of the processor may be configured to control one or more functions of one or more elements of the user interface through computer program instructions (for example, software and/or firmware) stored on a memory accessible to the processor (for example, volatile memory, non-volatile memory, and/or the like).

In some example embodiments, the processor 94 may be embodied as, include or otherwise control the connections parameters manager 97. The connections parameters manager 97 may be any means such as a device or circuitry operating in accordance with software or otherwise embodied in hardware or a combination of hardware and software (for example, processor 94 operating under software control, the processor 94 embodied as an ASIC or FPGA specifically configured to perform the operations described herein, or a combination thereof) thereby configuring the device or circuitry to perform the corresponding functions of the connections parameters manager 97, as described below. Thus, in an example in which software is employed, a device or circuitry (for example, the processor 94 in one example) executing the software forms the structure associated with such means.

The connections parameters manager 97 may send a request to the processor 104 for data indicating one or more friends, and/or friends of friends, of a user(s). In response to receipt of the friends data, the connections parameters manager 97 may, but need not, send one or more devices of the user and/or one or more devices of the identified friend(s) of the user(s) one or more connection parameters associated with a profile of the user(s). In response to receipt of the data associated with the one or more connection parameters, the devices of the user and/or the devices of the friend(s) may utilize the connection parameters to connect to one or more access points (for example, public APs and/or private APs) corresponding to the connection parameters. The devices may connect to the corresponding access points with minimal or no user interaction.

Referring now to FIG. 5, some example embodiments of a system for providing one or more connection parameters to one or more devices is provided. The system 7 may include one or more access points (APs) such as, for example, a RF AP 30, a WLAN AP 32, a BT AP 34, an IR AP 36, a WLAN AP 44, and a LAN AP 46. The system 7 may also include one or more home media servers 45 and one or more printers 41 (for example, a network printer(s) configured to utilize WLAN, etc.). According to some example embodiments, the home media server(s) 45 may, but need not, be a media server configured to utilize WLAN and/or Wi-Fi and which may store and enable provision of various digital media including, but not limited, to digital movies, video, music, audio, pictures, images, etc. Additionally, the system 7 may include one or more communication devices 165, 167 and 169 (for example, apparatuses 50 (for example, mobile terminal 10), second communication device 20, third communication device 25) as well as a social network device 108 (for example, network entity 100). The system 7 may also include a network device 110 (for example, network device 90). In the example embodiments of FIG. 5, the social network device 108 may be configured to store and maintain data associated with one or more friend connections or links. The social network device 108 may provide a social network service (for example, a social network service such as, for example, Facebook™, Twitter™, LinkedIn™, MySpace™, Skype™, etc.) to users. According to some example embodiments, the social network device 108 may be a standalone device. In other example embodiments, the social network device 108 may be embodied within the network device 110. The network device 110 may send a request to the social network device 108 requesting data indicating one or more friends of a user(s) of an apparatus (for example, apparatus 50).

Although FIG. 5 shows one WLAN AP 32, one RF AP 30, one WLAN AP 44, one LAN AP 46, one BT AP 34, one IR AP 36, one or more home media servers 45, one or more printers 41, three communications devices 165, 167, 169, one social network device 108 and one network device 110, it should be pointed out that any suitable number of WLAN APs 32, RF APs 30, WLAN APs 44, LAN APs 46, BT APs 34, IR APs 36, home media servers 45, printers 41, communication devices 165, 167, 169, social network devices 108 and network devices 110 may be part of system 7 without departing from the spirit and scope of the invention.

In the example embodiments of FIG. 5, the communication device 169 may detect signals (for example, beacons) from one or more access points such as, for example, Wi-Fi AP 32. The communication device 165 may detect signals (for example, beacons) from one or more access points such as, for example, WLAN AP 32, RF AP 30, WLAN AP 44 and WLAN AP 46. The communication device 167 may detect signals from one or more access points such as, for example, LAN AP 46, BT AP 34, IR AP 36, home media server(s) 45 and printer(s) 41.

For purposes of illustration and not of limitation, consider an example in which a user of a communication device 165 (for example, apparatus 50) may utilize the communication device 165 to detect one or more access points such as, for example, WLAN AP 32, RF AP 30, WLAN AP 44 and LAN AP 46. In this example, consider that the WLAN AP 32, RF AP 30, WLAN AP 44 and LAN AP 46 may be access points (for example, private APs) within a home of the user. Also, consider that the communication devices 167 and 169 may be devices of the user. In an instance in which the communication device 165 may detect the WLAN AP 32, RF AP 30, WLAN AP 44 and/or LAN AP 46, the configuration settings module 78 of the communication device 165 may configure the connection parameters (for example, network parameters) of the WLAN AP 32, RF AP 30, WLAN AP 44 and/or LAN AP 46 for establishing one or more connections with the communication device 165.

In response to obtaining or acquiring the connection parameters, the configuration settings module 78 may send a message to the social network device 108 requesting the social network device to utilize the data (for example, a username(s), a password(s), etc.) of a friend account of the user to authenticate the user with the network device 110. In some example embodiments, the configuration settings module 78 may send the message to the social network device 108 in response to receipt of a selection of an indication of a setting(s). The setting(s) may be selected by the user of the communication device via a display (for example, display 85), for example. The setting(s) may be a setting(s) for signing into an account of the user in a social network service provided by the social network device 108 and for using the information of the account (for example, friends account data) to authenticate the user with the network device 110 such that the configurations settings module 78 may send the connection parameters and associated data to the network device 110 for storage in a profile on behalf of the user.

In response to the processor 104 of the social network device 108 sending the account data to the network device 110, the connections parameters manager 97 of the network device 110 may authenticate the user. Upon successfully authenticating the user, the connections parameters manager 97 may send a message to the configuration settings module 78 of the communication device 165 indicating that the user is successfully authenticated and may request the connection parameters and associated data (for example, passwords, security settings (for example, security keys), certificates, information indicating other devices of the user (for example, communication devices 167, 169), etc.)). In response to receipt of the message from the connections parameters manager 97, the configuration settings module 78 may send the connection parameters and associated data to the network device 110. The network device 110 may store the connection parameters in a profile on behalf of the user. The profile may be stored in a memory (for example, memory 96) of the network device 110.

In an instance in which the user may activate one or more of the communication devices 165, 167, the connections parameters manager 97 may receive an indication of the activation and may analyze the data in the profile of the user and may send the connection parameters and associated data to the communication devices 167, 169. According to some example embodiments, the user may activate the communication devices 167, 169 to receive the connection parameters and associated data by selecting a feature to execute the configuration settings module 78. As such, in an instance in which the communication devices 167, 169 may be within a vicinity (for example, within the user's home) of the WLAN AP 32, RF AP 30, WLAN AP 44 and/or LAN AP 46, the configurations settings module 78 of the communication devices 167, 169 may utilize the connection parameters and the associated data (for example, a password(s) associated with WLAN AP 32) to automatically connect the communication devices 167, 169 to the Wi-Fi AP 32, RF AP 30, WLAN AP 44 and/or LAN AP 46.

The connection parameters of the WLAN AP 32, RF AP 30, WLAN AP 44 and/or LAN AP 46 may relate to one or more network settings of these access points. For instance, in some example embodiments, the connection parameters associated with the WLAN AP 32, the WLAN AP 44 and/or LAN AP 46 may include, but are not limited to, a network identifier(s), a network name(s) (for example, a service set identifier(s) (SSID), an authentication type(s) (for example, an Open network(s), a Wi-Fi Protected Access II (WPA2) pre-shared key(s), an extendable authentication protocol (EAP), one or more previously set keys (present keys)) and any other suitable data.

It should be pointed out that according to other example embodiments in which an access point (for example, WLAN AP 32) may be an enterprise access point or network device, the data associated with the connection parameters provided by the configuration settings module 78 of the communication device 165, for example, to the connections parameters manager 97 may include EAP data (for example, one or more certificates). In this regard, the connections parameters manager 97 may include the EAP data in the profile of the user of the communication device 165, for example. As such, one or more friends of the user of the communication device 165 may be required to provide some data (for example, a certificate) to the connections parameters manager 97 in order for a device(s) of the friends to connect with the enterprise access point. In this manner, one or more connections to an enterprise access point(s) may be more secure.

According to other example embodiments, consider an example in which the communication device 165 may be a device of first user (for example, user A) and the communication device 167 may be a device of a second user (for example, user B). In this example, consider also that the communication device 169 may be a device of a third user (for example, user C). In this example, the connections parameters manager 97 may analyze data in a profile(s) of a first user and may determine that the first user is friends with the second user and/or the third user. The connections parameters manager 97 may determine that the first user is friends with the second user and/or the third user in response to receiving data indicating one or more friends of the first user from the social network device 108. The connections parameters manager 97 may receive the friend information related to the first user in response to receipt of a message to authenticate the first user by using the first user's account information (for example, a password(s), a username(s)) of a social network service provided by the social network device 108.

In response to successfully authenticating the first user, the connections parameters manager 97 may include the connection parameters and associated data indicated in the profile of the first user into the profile(s) of the second user and/or the third user. In this regard, in an instance in which the connections parameters manager 97 may receive an indication (for example, a message) from the configuration settings module 78 of the communication devices 167, 169 that the configurations settings module 78 is being launched or executed, the connections parameters manager 97 may provide the connections parameters and associated data to the communication devices 167, 169. According to some example embodiments, the indication (for example, a message) indicating that the configurations settings module 78 is being launched or executed may be generated in response to receipt of an indication of a selection of the configuration settings module 78 of the communication devices 167, 169. Alternatively, the indication may be generated in response to receipt of a selection of a feature(s) provided by the configuration settings module 78 of the communication devices 167, 169. In this example, the connection parameters and associated data may relate to the network settings of the WLAN AP 32, RF AP 30, WLAN AP 44 and/or LAN AP 46 (open/public APs in this example) detected by the communication device 165. As such, in an instance in which the communication devices 167, 169 may be in the vicinity of the WLAN AP 32, RF AP 30, WLAN AP 44 and/or LAN AP 46, the configuration settings module 78 of the communication devices 167, 169 may utilize the connection parameters and associated data to automatically connect to the WLAN AP 32, RF AP 30, WLAN AP 44 and/or LAN AP 46. In an instance in which the configuration settings module 78 of the communication devices 167, 169 may utilize the passwords of the associated data to facilitate connection with one or more of the WLAN AP 32, RF AP 30, WLAN AP 44 and/or LAN AP 46 the identity of the passwords may be indiscernible by the users of the communication devices 167, 169. For instance, the operating system of the communication devices 167, 169 may know or determine the passwords, but the actual passwords may be hidden (for example, text associated with passwords being denoted by asterisks) from the users of the communication devices 167, 169.

In this example, the communication device 167 may detect one or more connection parameters and associated data corresponding to access points such as, for example, BT AP 34, IR AP 36, LAN AP 46, home media server(s) 45 and/or printer(s) 41. This connection parameter information and associated data may be stored in a profile of the second user by network device 110. In an instance in which the connections parameters manager 97 may determine that the second user is friends with first user and/or the third user, the connections parameters manager 97 may include the connection parameters and associated data, identified by the configuration settings module 78 of the communications device 167, in the respective profiles of the first user and the third user, in a manner analogous to that described above. In this regard, in an instance in which the communication devices 165 and 169 may be in the vicinity of the BT AP 34, IR AP 36, LAN AP 46, home media server(s) 45 and/or printer(s) 41, the configuration settings module 78 of the communication devices 165, 169 may utilize the connection parameters and associated data to automatically connect to one or more of the BT AP 34, IR AP 36, LAN AP 46, home media server(s) 45 and/or printer(s) 41, in a manner analogous to that described above.

The connection parameters for the printer(s) 41 may include, but are not limited to, a printer name(s), a network address(es), a printer type(s) and model(s), one or more paper settings as well as a user's basic settings such as, for example, printer quality, duplex or single sided printing, page separation parameters or the like, etc. In an instance in which another device (e.g., communication device 167) of a user may be within proximity of a printer(s) 41 or may detect the printer(s) 41 in which the device may have/store one or more associated settings, the device (e.g., communication device 167) or a network (e.g., network device 110) may install network printer device drivers from the network automatically and may apply the relevant settings to configure the printer(s) 41 (for example, upon startup of the printer(s) 41). The connection parameters for the media server(s) 45 may include, but are not limited to, a server name(s), one or more direct paths to shared music libraries, pictures, videos or the like, etc. The network device 110 and/or a communication device (e.g., communication device 167 may also facilitate sharing of home file-servers and the associated connection parameters may include, but are not limited to, a device network address(es) or name(s), username(s), password(s), one or more allowed direct paths to media data or the like, etc. In an example embodiment, the configuration settings module 78 and/or the connections parameter manager 97 may be utilized/invoked to facilitate sharing of any devices within a connection cloud or LAN of system 7 and may utilize relevant settings to enable the shared devices.

According to some example embodiments, in addition to providing connection parameters and associated data to one or more friends (for example, direct friends (for example, friends within a first level of trust)) of a user of a communication device (for example, communication device 165), the connections parameters manager 78 may, but need not, include the connection parameters and associated data within the profiles of friends of the friends (for example, indirect friends (for example, friends within a second or subsequent level of trust)) that may be designated by a user as being a direct friend(s). In this regard, the connection parameters manager 97 may provide communication parameters and associated data to devices of indirect friends of the user of a communication device (for example, communication device 165).

It should be pointed out that a user of a communication device (for example, communication device 165) may designate that only a subset of connection parameters and associated data identified in their profile(s) may be shared with friends of the user. For purposes of illustration and not of limitation, consider an instance in which a user may include data in their profile indicating that connection parameters and associated data for open or public access point networks should be shared with friends but that connection parameters and associated data for private or home access points should not be shared with friends. As another example for purposes of illustration and not of limitation, consider an example in which a user may designate that communication parameters and associated data related to access points identified in a profile of a user may be allowed to be shared with direct friends but that communication parameters and associated data should not be shared with indirect friends (for example, friends of direct friends). Additionally, for example, a user may modify their profile to designate that connection parameters and associated data for a particular access point(s) (for example, WLAN AP 32, WLAN AP 44) may be shared with one or more particular friends (for example, Friend A, Friend B, etc.) but may designate that the sharing of connection parameters and associated data with other friends is prohibited.

In some example embodiments, a user may utilize a communication device (for example, communication device 165 (for example, apparatus 50)) to sign in to a service provided by the network device 110 to utilize the connections parameters manager 97 to modify their profile(s) and may designate one or more subsets of the connection parameters and associated data to be shared with one or more designated friends. By enabling the connections parameters manager 97 to facilitate modifying of a profile(s) of a user(s) in a manner analogous to that described above, the connections parameters manager 97 may be configured to change a default setting related to sharing all connection parameters and associated data with friends, and/or friends of friends, of a corresponding user(s).

According to other example embodiments, a default setting utilized by the connections parameters manager 97 may indicate that newly detected connection parameters and associated data related to an access point(s) are to remain private and may not be shared with friends. However, the user may sign in to the service provided by the network device 110 and may modify their profile(s) to designate that the connections parameters and associated data may be shared with one or more friends.

Alternatively, in an instance in which the configuration settings module 78 may detect new connection parameters and associated data of an access point(s) (for example, a previously undetected AP, for example, a WLAN hotspot), the configuration settings module 78 may communicate with the connections parameter manager 97 to automatically update the profile(s) of a user to include the new connection parameters and associated data. These new connection parameters and associated data may be included by the connections parameter manager 97 in the respective profiles of friends, and/or friends of friends of the user (for example, a user of communication device 165). The configuration settings module 78 may also periodically communicate (for example, poll) with the connections parameters manager 97 to identify one or more changes (for example, a detection of a new access point(s) and corresponding connection parameters), in real-time, to one or more profiles of friends, and/or friends of friends of a user. In an instance in which the connections parameters manager 97 may determine that there is a change in a profile(s) of a friend(s), the connections parameter manager 97 may update the profile(s) of the user to include data corresponding to the change(s) and may send a message to the configuration settings module 78 indicating the change(s) of the profile of the friend and the corresponding update to the profile(s) of the user.

In some example embodiments, the connection parameters and associated data included in one or more profiles by the connections parameters manager 97, which may be stored by a memory (for example, memory 96) of the network device 110, may also include location information corresponding to a location of one or more respective access points (for example, WLAN AP 32, WLAN AP 44). According to some example embodiments, the location information may include, but is not limited to, global positioning system (GPS) coordinates, one or more latitude, longitude and/or altitude coordinates or any other suitable location data. The GPS coordinates or the latitude, longitude, altitude coordinates associated with the respective locations of access points may be obtained by the positioning sensor 72 of a communication device (for example, communication device 165).

By utilizing the location information associated with the connection parameters of a profile(s), the connections parameters manager 97 may provide connections parameters and associated data to a communication device (for example, communication device 165) of a user in an instance in which the communication device may be within a corresponding location or vicinity of one or more respective locations of access points. On the hand, the connections parameters manager 97 may not provide the configurations settings module 78 with connections parameters and associated data for one or more access points in an instance in which the communication device (for example, communication device 165) is not located within a vicinity of respective access points.

Referring now to FIG. 6, a flowchart for enabling sharing of one or more connectivity settings with one or more devices based in part on one or more social network connections according to some example embodiments is provided. At operation 600, an apparatus (for example, configurations settings module 78) may detect one or more connection parameters (for example, network settings) and associated data (for example, passwords, security settings (for example, an item of security data (for example, security keys), certificates (for example, digital certificates, EAP certificates), etc.) of at least one access point (for example, WLAN AP 32, WLAN AP 44, etc.). At operation 605, an apparatus (for example, configurations settings module 78) may facilitate provision of the connection parameters and associated data for inclusion within at least one profile of a user. The profile may be associated with a social network service (for example, Facebook™, Twitter™, LinkedIn™, MySpace™, Skype™, etc.) identifying one or more relationships among one or more determined friends of the user(s). At operation 610, an apparatus (for example, configurations settings module 78) may enable provision of the connection parameters and associated data to at least one device (for example, communication device 165) of the user(s) or one or more devices (for example, communication device 167, and/or communication device 169) of the friends. In some example embodiments, an apparatus (for example, configurations settings module 78) may enable provision by enabling the device of the user(s) or the devices of the friends to utilize the connection parameters and associated data to connect to the access point. Optionally, at operation 615, an apparatus (for example, configurations settings module 78) may receive one or more connectivity parameters and associated items of information related to one or more respective access points (for example, WLAN AP 44, LAN AP 46, BT AP 34, etc.) detected by one or more devices of the friends. Optionally, at operation 620, the apparatus (for example, configurations settings module 78) may utilize the received connectivity parameters and the associated items of information to connect to one or more of the respective access points.

It should be pointed out that FIG. 6 is a flowchart of a system, method and computer program product according to some example embodiments of the invention. It will be understood that each block of the flowchart, and combinations of blocks in the flowchart, can be implemented by various means, such as hardware, firmware, and/or a computer program product including one or more computer program instructions. For example, one or more of the procedures described above may be embodied by computer program instructions. In this regard, in some example embodiments, the computer program instructions which embody the procedures described above are stored by a memory device (for example, memory device 76, memory 96, memory 106) and executed by a processor (for example, processor 70, processor 94, processor 104, configuration settings module 78, connections parameters manager 97). As will be appreciated, any such computer program instructions may be loaded onto a computer or other programmable apparatus (for example, hardware) to produce a machine, such that the instructions which execute on the computer or other programmable apparatus cause the functions specified in the flowchart blocks to be implemented. In some example embodiments, the computer program instructions are stored in a computer-readable memory that can direct a computer or other programmable apparatus to function in a particular manner, such that the instructions stored in the computer-readable memory produce an article of manufacture including instructions which implement the function(s) specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart blocks.

Accordingly, blocks of the flowchart support combinations of means for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some example embodiments, an apparatus for performing the method of FIG. 6 above may comprise a processor (for example, the processor 70, the processor 94, processor 104, the configuration settings module 78, the connections parameters manager 97) configured to perform some or each of the operations (600-620) described above. The processor may, for example, be configured to perform the operations (600-620) by performing hardware implemented logical functions, executing stored instructions, or executing algorithms for performing each of the operations. Alternatively, the apparatus may comprise means for performing each of the operations described above. In this regard, according to some example embodiments, examples of means for performing operations (600-620) may comprise, for example, the processor 70 (for example, as means for performing any of the operations described above), the processor 94, the processor 104, the configuration settings module 78, the connections parameters manager 97 and/or a device or circuitry for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
    detecting one or more connection parameters and associated data of at least one access point;
    facilitating provision, via a processor, of the connection parameters and associated data for inclusion within at least one profile of a user, the profile is associated with one or more social network services identifying one or more previously established relationships among one or more determined friends of the user; and
    enabling provision of the connection parameters and associated data to at least one of a device of the user or one or more devices of the friends.

2. The method of claim 1, wherein enabling provision comprises enabling the device of the user or the devices of the friends to utilize the connection parameters and associated data to connect to the access point.

3. The method of claim 1, further comprising:
    receiving one or more connectivity parameters and associated items of information related to one or more respective access points detected by one or more devices of the friends.

4. The method of claim 3, further comprising:
    utilizing the connectivity parameters and the associated items of information to connect to one or more of the respective access points.

5. The method of claim 4, wherein utilizing comprises utilizing the connectivity parameters and the associated items of information to connect to one or more of the respective access points in an instance in which the devices are within a vicinity of the respective access points.

6. The method of claim 3, wherein prior to receiving the connectivity parameters, the method further comprises receiving an indication that the profile of the user is updated in response to the connection parameters and associated data being included in the profile of the user or one or more respective profiles of the friends of the user.

7. The method of claim 1, wherein:
    the access point comprises at least one of a wireless local area network access point or a local area network access point; and
    the connection parameters comprises one or more network settings configured to facilitate connection with the access point, the associated data comprises at least one of a password, an item of security data, or a certificate.

8. The method of claim 1, further comprising:
    enabling modification of the profile of the user to designate that the connection parameters and associated data is to be shared with a portion of the friends while excluding a remaining portion of the friends from receiving the connection parameters and associated data.

9. The method of claim 1, wherein enabling provision comprises enabling the device of the user or the devices of the friends to utilize the connection parameters and the associated data to automatically connect to the access point.

10. The method of claim 1, wherein the social network service is at least Facebook, Twitter, LinkedIn, MySpace, Skype or other established social network service.

11. An apparatus comprising:
    at least one processor; and
    at least one memory including computer program code configured to, with the at least one processor, cause the apparatus to perform at least the following:
    detect one or more connection parameters and associated data of at least one access point;
    facilitate provision of the connection parameters and associated data for inclusion within at least one profile of a user, the profile is associated a with one or more social network services identifying one or more previously established relationships among one or more determined friends of the user; and enable provision of the connection parameters and associated data to at least one of a device of the user or one or more devices of the friends.

12. The apparatus of claim 11, wherein the memory and computer program code are configured to, with the processor, cause the apparatus to:

enable provision by enabling the device of the user or the devices of the friends to utilize the connection parameters and associated data to connect to the access point.

13. The apparatus of claim 11, wherein the memory and computer program code are configured to, with the processor, cause the apparatus to:

receive one or more connectivity parameters and associated items of information related to one or more respective access points detected by one or more devices of the friends.

14. The apparatus of claim 13, wherein the memory and computer program code are configured to, with the processor, cause the apparatus to:

utilize the connectivity parameters and the associated items of information to connect to one or more of the respective access points.

15. The apparatus of claim 14, wherein the memory and computer program code are configured to, with the processor, cause the apparatus to:

utilize the connectivity parameters by utilizing the connectivity parameters and the associated items of information to connect to one or more of the respective access points in an instance in which the devices are within a vicinity of the respective access points.

16. The apparatus of claim 13, wherein prior to receive the connectivity parameters, the memory and computer program code are configured to, with the processor, cause the apparatus to:

receive an indication that the profile of the user is updated in response to the connection parameters and associated data being included in the profile of the user or one or more respective profiles of the friends of the user.

17. The apparatus of claim 11, wherein:

the access point comprises at least one of a wireless local area network access point or a local area network access point; and the connection parameters comprises one or more network settings configured to facilitate connection with the access point, the associated data comprises at least one of a password, an item of security data, or a certificate.

18. The apparatus of claim 11, wherein the memory and computer program code are configured to, with the processor, cause the apparatus to:

enable modification of the profile of the user to designate that the connection parameters and associated data is to be shared with a portion of the friends while excluding a remaining portion of the friends from receiving the connection parameters and associated data.

19. The apparatus of claim 11, wherein the memory and computer program code are configured to, with the processor, cause the apparatus to:

enable provision by enabling the device of the user or the devices of the friends to utilize the connection parameters and the associated data to automatically connect to the access point.

20. The apparatus of claim 11, wherein the social network service is at least Facebook, Twitter, LinkedIn, MySpace, Skype, or other established social network service.

21. An apparatus comprising:
at least one processor; and
at least one memory including computer program code configured to, with the at least one processor, cause the apparatus to perform at least the following:
receive a detection of one or more connection parameters and associated data of at least one access point;
facilitate inclusion of the connection parameters and associated data within at least one profile of a user, in response to determining that the profile is associated with one or more social network services identifying one or more previously established relationships among one or more friends of the user; and
enable provision of the one or more connection parameters and associated data to at least one of a device of the user or one or more devices of the friends to enable the device or the devices to utilize the connection parameters and associated data to connect to the access point.

22. The apparatus of claim 21, wherein prior to enable provision of the connection parameters, the memory and computer program code are configured to, with the processor, cause the apparatus to:

update one or more respective profiles of the friends to include data indicating the connection parameters and associated data; and enable provision of data of the profiles to at least one friend of a plurality of friends linked to the user to enable at least one communication device of the at least one friend to utilize the connection parameters and associated data to connect to the access point.

23. The apparatus of claim 21, wherein the social network service is at least Facebook, Twitter, LinkedIn, MySpace, Skype, or other established social network service.

24. A method comprising:
receiving a detection of one or more connection parameters and associated data of at least one access point;
facilitating inclusion, via a processor, of the connection parameters and associated data within at least one profile of a user, in response to determining that the profile is associated with one or more social network services identifying one or more previously established relationships among one or more friends of the user; and
enabling provision of the one or more connection parameters and associated data to at least one of a device of the user or one or more devices of the friends to enable the device or the devices to utilize the connection parameters and associated data to connect to the access point.

25. The method of claim 24, wherein prior to enabling provision of the connection parameters, the method further comprises:

updating one or more respective profiles of the friends to include data indicating the connection parameters and associated data; and enabling provision of data of the profiles to at least one friend of a plurality of friends linked to the user to enable at least one communication device of the at least one friend to utilize the connection parameters and associated data to connect to the access point.

26. The method of claim 24, wherein the social network service is at least Facebook, Twitter, LinkedIn, MySpace, Skype, or other established social network service.

* * * * *